(12) United States Patent
Fisher

(10) Patent No.: US 9,009,081 B2
(45) Date of Patent: *Apr. 14, 2015

(54) PURCHASING TICKETS USING AN NFC ENABLED MOBILE COMMUNICATION DEVICE

(71) Applicant: Michelle Fisher, Oakland, CA (US)

(72) Inventor: Michelle Fisher, Oakland, CA (US)

(73) Assignee: Michelle Fisher, Marina Del Rey, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/858,925

(22) Filed: Apr. 8, 2013

(65) Prior Publication Data

US 2013/0226635 A1     Aug. 29, 2013

Related U.S. Application Data

(63) Continuation of application No. 11/933,351, filed on Oct. 31, 2007, which is a continuation-in-part of application No. 11/467,441, filed on Aug. 25, 2006, now abandoned.

(60) Provisional application No. 60/766,171, filed on Dec. 31, 2005, provisional application No. 60/766,172, filed on Dec. 31, 2005.

(51) Int. Cl.
| | |
|---|---|
| *G06Q 20/00* | (2012.01) |
| *G06Q 20/32* | (2012.01) |
| *G06Q 10/02* | (2012.01) |
| *G06Q 20/20* | (2012.01) |
| *G06Q 20/42* | (2012.01) |
| *G06Q 30/06* | (2012.01) |

(52) U.S. Cl.
CPC ............ *G06Q 20/3278* (2013.01); *G06Q 10/02* (2013.01); *G06Q 20/20* (2013.01); *G06Q 20/32* (2013.01); *G06Q 20/325* (2013.01); *G06Q 20/327* (2013.01); *G06Q 20/425* (2013.01); *G06Q 30/0641* (2013.01)

(58) Field of Classification Search
CPC .................................................. G06Q 20/3229
USPC ............... 705/5, 64; 455/41.1, 41.2, 552, 556
See application file for complete search history.

(56) References Cited

U.S. PATENT DOCUMENTS

| | | |
|---|---|---|
| 6,038,367 A | 3/2000 | Abecassis |
| 6,128,655 A | 10/2000 | Fields et al. |
| 6,141,666 A | 10/2000 | Tobin |
| 6,199,082 B1 | 3/2001 | Ferrel et al. |
| 6,415,156 B1 | 7/2002 | Stadelmann |
| 6,605,120 B1 | 8/2003 | Fields et al. |
| 6,771,981 B1 | 8/2004 | Zalewski et al. |
| 6,772,396 B1 | 8/2004 | Cronin et al. |
| 6,920,331 B1 | 7/2005 | Sim et al. |
| 6,950,939 B2 | 9/2005 | Tobin |
| 7,031,945 B1 | 4/2006 | Donner |
| 7,069,248 B2 | 6/2006 | Huber |

(Continued)

*Primary Examiner* — Charles C Agwumezie

(57) ABSTRACT

A method for using a mobile communication device to purchase a ticket for an event. The method comprises locating an event of interest to a user through the mobile communication device, displaying a seating map of a venue in which the event of interest is being held, the seating map being displayed on the mobile communication device, receiving user input selecting an available seat on the seating map, issuing an electronic ticket to the user for the seat, and storing the electronic ticket on the mobile communication device.

26 Claims, 10 Drawing Sheets

(56) References Cited

U.S. PATENT DOCUMENTS

| | | |
|---|---|---|
| 7,096,003 B2 | 8/2006 | Joao et al. |
| 7,110,744 B2 | 9/2006 | Freeny, Jr. |
| 7,110,792 B2 | 9/2006 | Rosenberg |
| 7,127,236 B2 | 10/2006 | Khan et al. |
| 7,289,810 B2 | 10/2007 | Jagadeesan |
| 7,308,254 B1 | 12/2007 | Rissanen |
| 7,357,312 B2 | 4/2008 | Gangi |
| 7,379,920 B2 | 5/2008 | Leung et al. |
| 7,392,226 B1 * | 6/2008 | Sasaki et al. .................... 705/64 |
| 7,472,829 B2 | 1/2009 | Brown |
| 7,482,925 B2 | 1/2009 | Hammad et al. |
| 7,522,905 B2 | 4/2009 | Hammad et al. |
| 7,813,745 B2 | 10/2010 | Li |
| 8,275,312 B2 * | 9/2012 | Fisher .......................... 455/41.2 |
| 2002/0010603 A1 * | 1/2002 | Doi et al. ......................... 705/5 |
| 2002/0025797 A1 | 2/2002 | Joao et al. |
| 2002/0065774 A1 | 5/2002 | Young et al. |
| 2002/0077918 A1 | 6/2002 | Lerner et al. |
| 2002/0107756 A1 | 8/2002 | Hammons et al. |
| 2002/0169984 A1 | 11/2002 | Kumar et al. |
| 2003/0065805 A1 | 4/2003 | Barnes, Jr. |
| 2003/0093695 A1 * | 5/2003 | Dutta ............................ 713/201 |
| 2003/0172028 A1 | 9/2003 | Abell et al. |
| 2004/0029569 A1 | 2/2004 | Khan et al. |
| 2004/0030658 A1 * | 2/2004 | Cruz ............................... 705/65 |
| 2004/0235450 A1 * | 11/2004 | Rosenberg .................... 455/406 |
| 2004/0243519 A1 | 12/2004 | Pertilla et al. |
| 2004/0267618 A1 | 12/2004 | Judicibus et al. |
| 2005/0076210 A1 | 4/2005 | Thomas et al. |
| 2005/0215231 A1 | 9/2005 | Bauchot et al. |
| 2006/0089160 A1 | 4/2006 | Ohtmer |
| 2006/0169768 A1 | 8/2006 | Gangi |
| 2006/0206709 A1 | 9/2006 | Labrou et al. |
| 2007/0022058 A1 | 1/2007 | Labrou et al. |
| 2007/0095892 A1 | 5/2007 | Lyons et al. |
| 2007/0125838 A1 | 6/2007 | Law et al. |
| 2007/0125840 A1 | 6/2007 | Law et al. |
| 2007/0255662 A1 | 11/2007 | Tumminaro |
| 2008/0010196 A1 | 1/2008 | Rackley, III et al. |
| 2008/0017704 A1 | 1/2008 | VanDeburg et al. |
| 2008/0048022 A1 | 2/2008 | Vawter |
| 2008/0051142 A1 | 2/2008 | Calvet et al. |
| 2008/0139155 A1 | 6/2008 | Boireau et al. |
| 2008/0167988 A1 | 7/2008 | Sun et al. |
| 2008/0177668 A1 | 7/2008 | Delean |
| 2008/0208681 A1 | 8/2008 | Hammad et al. |
| 2008/0208743 A1 | 8/2008 | Arthur et al. |
| 2008/0208744 A1 | 8/2008 | Arthur et al. |
| 2008/0208762 A1 | 8/2008 | Arthur et al. |
| 2008/0255947 A1 | 10/2008 | Friedman |
| 2008/0275779 A1 | 11/2008 | Lakshminarayanan |
| 2008/0294556 A1 | 11/2008 | Anderson |
| 2008/0305774 A1 | 12/2008 | Ramakrishna |
| 2009/0075592 A1 * | 3/2009 | Nystrom et al. ............. 455/41.1 |
| 2009/0098825 A1 | 4/2009 | Huomo et al. |
| 2009/0143104 A1 * | 6/2009 | Loh et al. ...................... 455/558 |
| 2009/0144161 A1 | 6/2009 | Fisher |
| 2010/0057619 A1 | 3/2010 | Weller et al. |
| 2010/0063895 A1 | 3/2010 | Dominguez et al. |
| 2010/0105375 A1 | 4/2010 | Schroter |

* cited by examiner

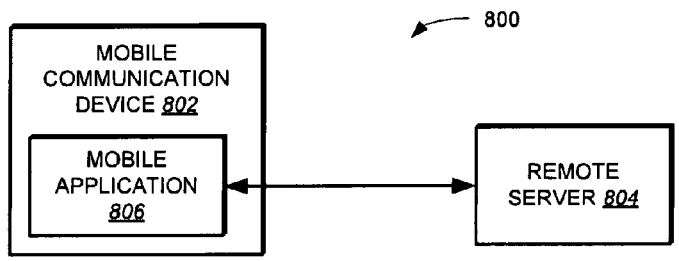
FIG. 8
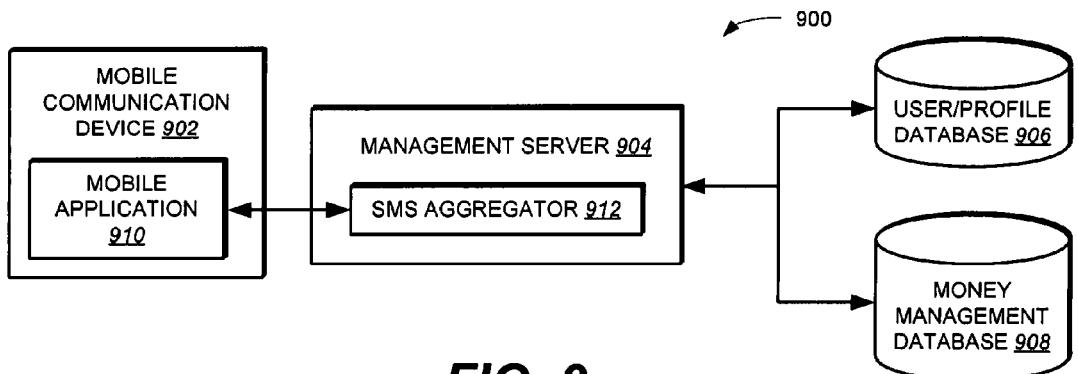
FIG. 9
FIG. 10A
FIG. 10B

PURCHASING TICKETS USING AN NFC ENABLED MOBILE COMMUNICATION DEVICE

PRIORITY CLAIMS/RELATED APPLICATIONS

This application is a continuation of and claims priority under 35 USC 120 to U.S. patent application Ser. No. 11/933,351, filed Oct. 31, 2007, and entitled "Method and System for Purchasing Tickets Using A Mobile Communication Device" which in turn is a continuation-in-part of application Ser. No. 11/467,441, filed Aug. 25, 2006, which claims priority to U.S. Provisional Patent Application No. 60/766,171 and U.S. Provisional Patent Application No. 60/766,172, both filed on Dec. 31, 2005.

FIELD OF INVENTION

The present invention relates to data communications and wireless devices.

BACKGROUND OF THE INVENTION

Online transactions—e.g., for purchasing goods, receiving downloads, and so on—which involve personal computers and the Internet are well known. Further, wireless mobile communication devices, such as cell phones, blackberries or other personal digital assistants, are also being used for making transactions. For example, U.S. Patent Application No. US/2003/0172028 provides a description of a personal payment system that utilizes a wireless enabled device such as a cell phone. As described, the personal payment system interacts using a Bluetooth protocol with a terminal located nearby the wireless enabled device. In another example, U.S. Pat. No. 7,031,945 describes a system and method that provides an electronic ticket to a smart card or standard wireless device that is identified with a user's account.

Further, wireless mobile devices that include a near field communication (NFC) device and a smart card (that uses an RFID for identification purposes) allow a person to securely make a simple transaction, such as for example, purchasing a bus ticket. In such an example, the person typically waves the wireless mobile device near a reader installed in a bus, and a price of the bus ticket is deducted from a total amount that is available and stored on the smart card of the wireless mobile device. Optionally, the amount of the bus ticket can be forwarded to a server that can identify the identification code of the particular RFID and then subsequently charge the person for the purchase of the bus ticket.

While the references discussed above illustrate that certain transactions are possible using wireless mobile devices, one problem associated with the references are is that implementations described in the references are not useful in a wide variety of different platforms, but rather are typically tied to a specific platform. For example, NFC devices are only usable with NFC readers. Another problem is that conventional wireless mobile devices generally have a very limited ability to be used in transactions.

BRIEF SUMMARY OF THE INVENTION

In general, in one aspect, this specification describes a method and system for using a mobile communication device to purchase a ticket for an event. The method comprises locating an event of interest to a user through the mobile communication device, displaying a seating map of a venue in which the event of interest is being held, the seating map being displayed on the mobile communication device, receiving user input selecting an available seat on the seating map, issuing an electronic ticket to the user for the seat, and storing the electronic ticket on the mobile communication device.

The details of one or more implementations are set forth in the accompanying drawings and the description below. Other features and advantages will be apparent from the description and drawings, and from the claims.

BRIEF DESCRIPTION OF THE DRAWINGS

FIG. 8 illustrates a communication system in accordance with one implementation.

FIG. 9 illustrates a communication system in accordance with one implementation.

FIGS. 10A-10B illustrate example client user interfaces that are displayable on a display of the mobile communication device of FIG. 9.

Like reference symbols in the various drawings indicate like elements.

DETAILED DESCRIPTION OF THE INVENTION

Figure 1:
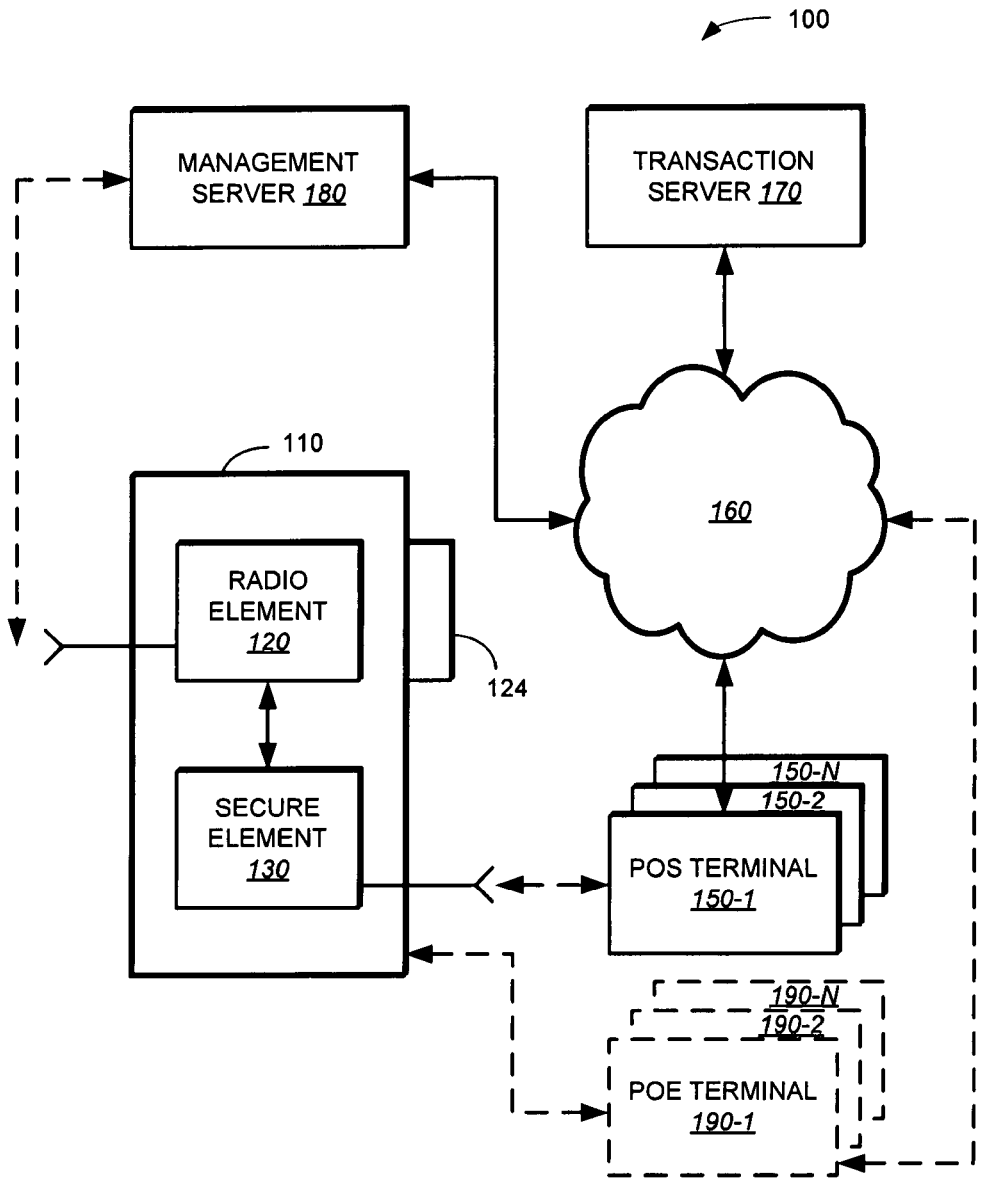
FIG. 1 illustrates one implementation of a block diagram of a communication system including a wireless mobile communication device.

This disclosure describes a communication system and method for assisting a user to complete a transaction. FIG. 1 illustrates one implementation of a communication system 100. The communication system 100 includes a hand-held, wireless mobile communication device 110 that (in one implementation) includes a radio element 120 and a secure element 130. A display 124 is shown associated with the radio element 120, and antennas (not labeled) are shown as associated with each of the radio element 120 and the secure element 130. Each antenna can physically be implemented in a manner that is different from the wireless antennas shown in FIG. 1. For example, an antenna can comprise a stripe that is passed along a reader, or comprise some suitable transmission mechanism. Although elements 120 and 130 are shown as distinct and separate, and display 124 is shown as connected to the radio element 120, other configurations are possible. In particular, a combination in which a single processor is used to execute the functions that are currently performed and described herein as being provided by both the radio element 120 and the secure element 130. Further as illustrated in FIG. 1, both the radio element 120 and the secure element 130 are internal to the mobile communication device 110, although in other implementations the secure element 130 can be external to the mobile communication device 110, as described below. Also, various different functionalities can be included within the radio element 120 and the secure element 130.

In one implementation, the mobile communication device 110 has the functionality to communicate with one of many different a point of sale (POS) terminals 150-1 to 150-n— e.g., in a contactless manner using a wireless protocol. The mobile communication device 110 can also similarly communicate with one or more point of entry (POE) terminals 190-1 to 190-n. The point-of-sale terminal 150 receives one of the transaction request signals from the mobile communication device 110 and transmits the one transaction request signal to a transaction server 170, typically using a communication channel 160 such as the Internet. The transaction server 170 verifies the transaction, and forwards a transaction verification signal to the management server 180. The management server 180 identifies the user corresponding to the transaction verification signal, and provides a first transaction response signal back to the mobile communication device 110 as one of the transaction signals.

In one implementation, the first transaction response signal is communicated back to the mobile communication device 110 using a communication channel that is different from the communication channel used to initiate the transaction. In one implementation, different transaction response signals can be communicated back to the mobile communication device 110 using communication channels from the management server 180 to the radio element 120 associated with the device 110, as well as from the management server 180 to the secure element 130 through the POS terminal 150 or the POE terminal 190. Further detailed descriptions of these implementations are discussed in greater detail below.

Figure 2:
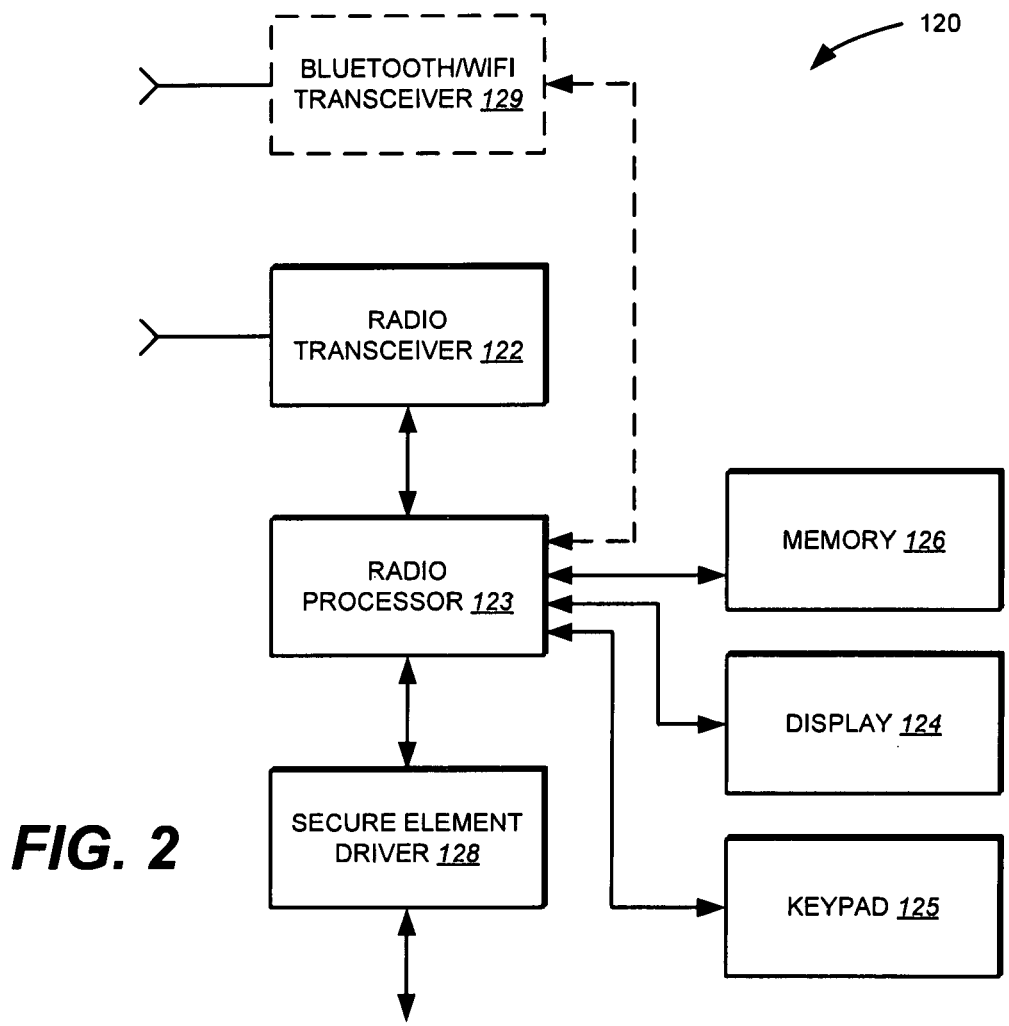
FIG. 2 illustrates one implementation of radio element in the wireless mobile communication device of FIG. 1.

FIG. 2 illustrates one implementation of the radio element 120 associated with the mobile communication device 110, and illustrates the radio element 120 connected to the display 124 of the mobile communication device 110. In one implementation, the radio element 120 includes a radio transceiver 122 that is adapted to send outgoing voice and data signals and receive incoming voice and data signals over a radio communication channel. The radio communication channel can be a digital radio communication channel, such as CDMA or GSM. Such a radio communication channel has the capacity to communicate both voice and data messages using conventional techniques. The radio transceiver 122 communicates with a radio processor 123, which processor has the capability to perform not only the radio communication services necessary to allow for phone and data communications, but can also execute various programs that are stored in the memory 126, which programs can receive inputs from the user via the display 124 and/or a keypad 125 associated with the mobile communication device 110.

In one implementation, application programs running on the radio processor 123 are, e.g., BREW or J2ME applications and can encompass a broad array of application types. For example, current applications include games, enterprise applications, and multimedia applications. In one implementation, the radio processor 123 runs an application that provides movie and event information. Such an application can comprise ticketing applications, content, item and service purchase applications, and/or payment management applications (referred to herein also as "wallet applications"). In one implementation, the radio processor 123 also has the capability of recognizing secure communications, and transmits data which must be stored in a secure environment to the secure element driver 128 for transmission to the secure element 130. In one implementation, in which both the radio element 120 and the secure element 130 are internal to the mobile communication device 110, transmissions to the secure element 130 can take place using an internal wired communication channel. In one implementation, the radio processor 123 also has the capability of receiving data from the secure element 130, e.g., using the internal wired communication channel. In one implementation, the secure element 130 and the radio element 120 communicate using signals described in the Java Card 2.1 Platform API Specification.

Figure 3:
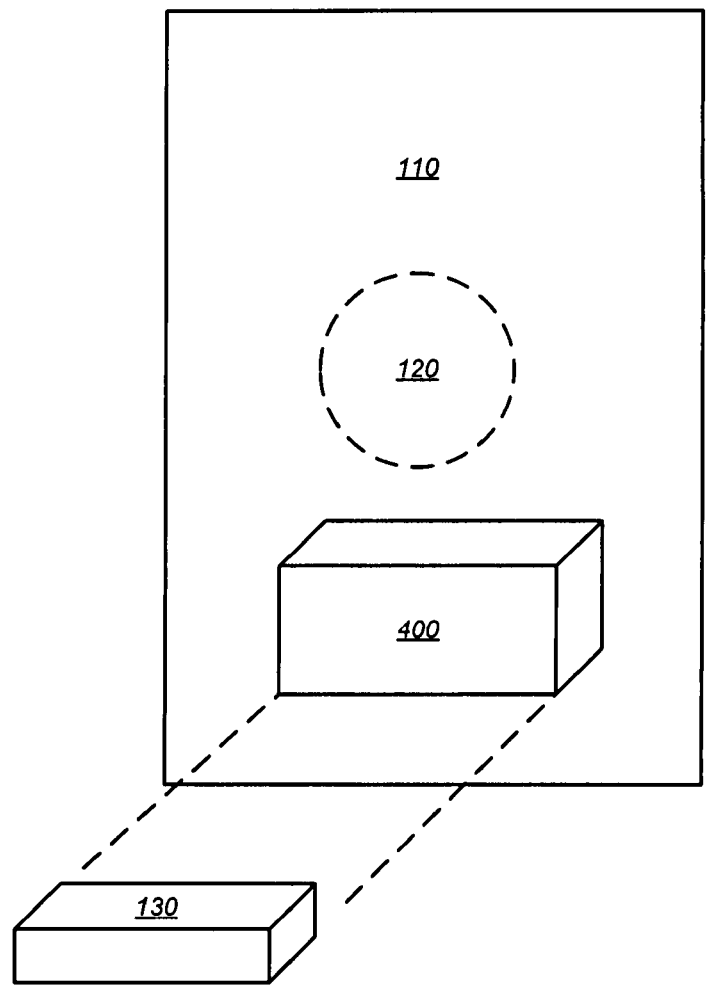
FIG. 3 illustrates one implementation of a wireless mobile communication device.

In one implementation, both the radio element 120 and the secure element 130 are disposed internally within a body of the mobile communication device 110. For example, referring to FIG. 3, the mobile communication device 110 is shown including a slot 400, which allows for the insertion of a secure element 130 into the slot 400. In this configuration, the secure element 130 can be purchased independently of the mobile communication device 110. The secure element 130 can also be disposed into a slot that only provides for physical insertion and mechanical connection to the body of the mobile communication device 110. In such an implementation, the secure element can include a transceiver that allows for the communication with the radio element 130 through a wireless local communication channel. The radio element 120 also is illustrated as optionally including another transceiver 129, such as a Bluetooth or WIFI transceiver, which can transmit and receive signals with an external device and then communicate signals to and from the radio processor 123. This additional communication channel allows for communications between other external devices, such as an external Bluetooth enabled smartcard, and provides an additional communication channel that is useful for certain transactions, as described further herein.

Figure 4A:
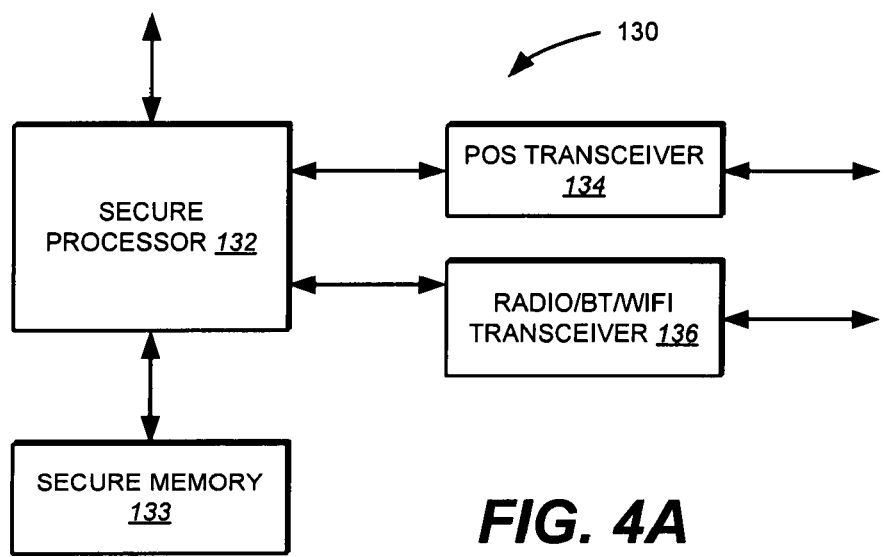
FIGS. 4A-4C respectively illustrate an implementation of a secure element in the wireless mobile communication device of FIG. 1.

FIG. 4A illustrates one implementation of the secure element 130 associated with the mobile communication device 110. The secure element 130 can be a smart card. In one implementation, the secure element 130 includes a secure processor 132, a secure memory 133, and a POS transceiver 134 adapted to send transaction request signals and receive transaction response signals over a first communication channel. In one implementation, the secure processor 132 communicates via the secure element driver 128 with the radio processor 123 using signals as described in the Java Card 2.1 Platform API Specification. The transaction request signals and the transaction response signals associated with the transaction can include an identification code associated with the user, as well as information relative to the transaction, such as item, quantity, vendor, and so on. In one implementation, the POS transceiver 134 is an NFC device, which uses an NFC modem. The POS transceiver 134 can also be a Bluetooth, WIFI or other transceiver. In an implementation in which the POS transceiver is an NFC modem, such an NFC modem will typically have a set of registers that can be read/written by the secure processor 132. These registers are in turn available for reading and writing over the RFID communications channel and serve as a shared memory between the secure processor 123 within the secure element 130 and the RFID reader that is associated with the POS terminal 150. This communication is specified, for example, in the ISO 14443A/B standard. The secure element can optionally include a radio/Bluetooth/WIFI transceiver 136, which can communicate with other devices, such as a transceiver associated with the radio processor 120 or for other external devices having those communication capabilities, thus allowing for more flexibility.

Figure 4B:
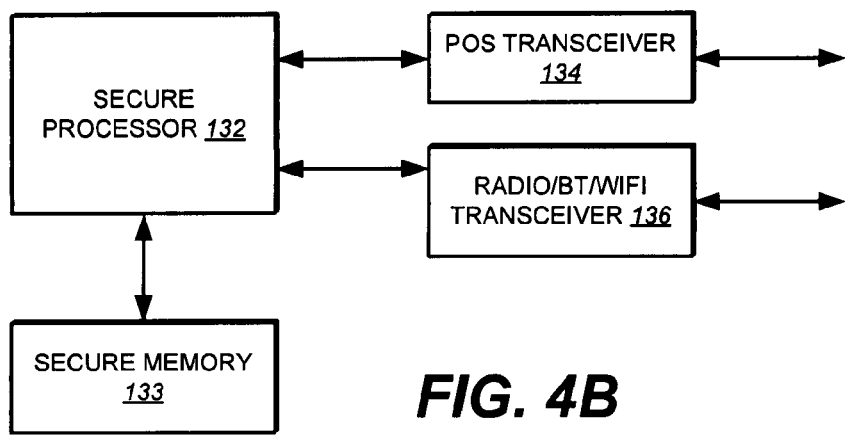

FIG. 4B shows another implementation of a secure element 130, in which the radio element 120 does not communicate with the secure element 130 through a secure element driver 128. In this case, for example, the secure element 130 may be external to the mobile communication device 110 and as such is not connected to the radio element through the secure element driver 128. In such an implementation, however, if the transceiver 136 as described above is included, and a similar transceiver 129 associated with the radio element 130 as described previously with respect to FIG. 2 is included, then this communication channel can be used to wirelessly obtain direct communications between the radio element 120 and the secure element 130. This implementation allows for certain bidirectional communications with other devices, as well as with the radio element 120, and as such more functionality and flexibility is achieved. This implementation is particularly useful since it establishes a direct local communication path with the radio element 120, since there is not communications with the radio element 120 via the path of driver 128.

This implementation allows for certain bidirectional communications with other devices, as well as with the radio element 120, and as such more functionality and flexibility is achieved. This implementation is particularly useful for establishing a direct local communication path with the radio element 120, since there are no communications with the radio element 120 via the path of driver 128. If either of the transceivers 129 or 136 are not associated with the respective radio element 120 or secure element 130, and there is no direct connection between the radio element 120 and the secure element 130, then a direct communication link between the radio element 120 an the secure element 130 will not exist. As such, while ticketing and many transactions can still exist, data from a real-time transaction performed using the secure element 130 cannot be made directly available to the radio processor and the applications stored thereon. In such an implementation, certain redundancy checks may not occur. For example, a ticketing application can be programmed to provide an alert if a ticket receipt has not been received within a certain period of time. Such an alert would not be possible to program directly (although it could be programmed indirectly via the button panel on the phone).

Figure 7:
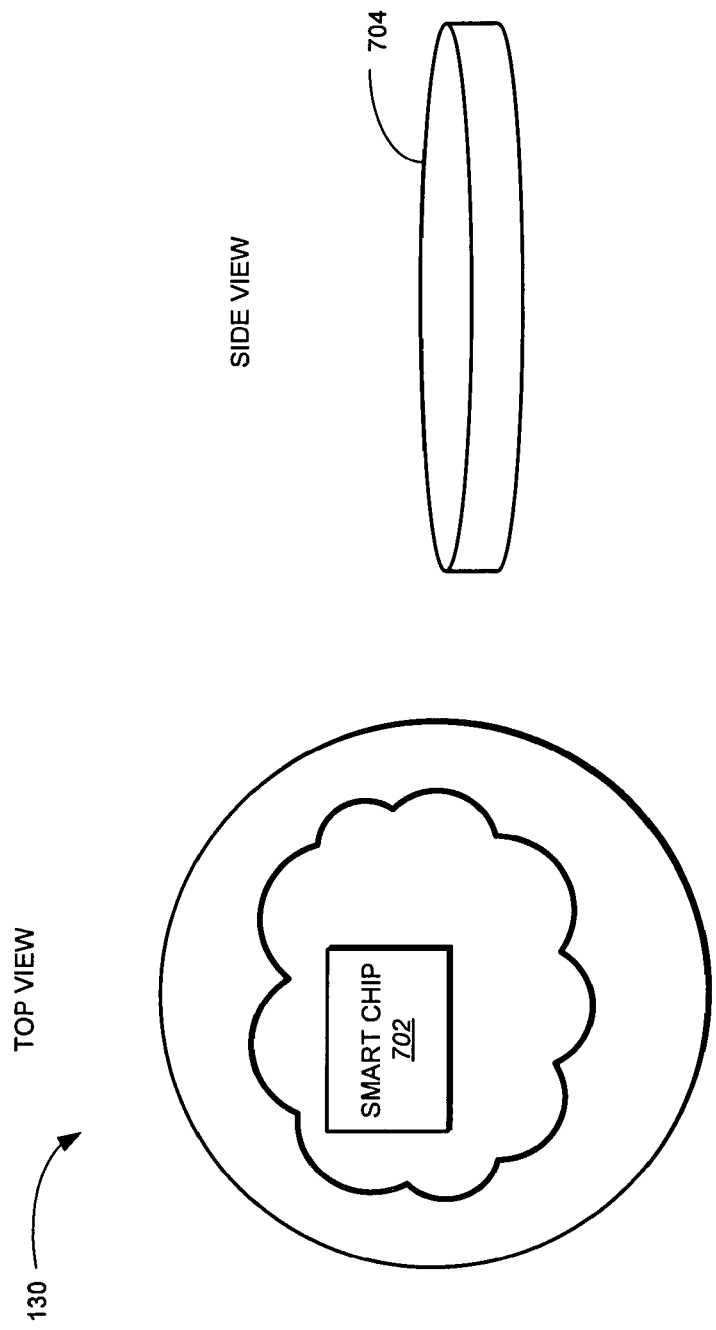
FIG. 7 illustrates one implementation of a secure element that is attachable to a wireless communication device.

FIG. 7 illustrates one implementation of a secure element 130 that can be attached (or affixed) externally to a wireless communication device (e.g., mobile communication device 110). In one implementation, the secure element 130 has circular shape. The secure element 130 can have other suitable shapes—e.g., rectangular, triangular, and so on. In one implementation, the secure element 130 includes an embedded smart chip 702 that is capable of executing proximity services (e.g., services related to payments, ticketing, identification, sending coupons, etc.). In one implementation, the smart chip 702 is capable of 2-way wireless communication (e.g., RFID, NFC, Bluetooth, etc.) with a supporting 3rdParty terminal. In one implementation, the 2-way communication is performed using a communication protocol that is different from a communication protocol through which the mobile communication device sends or receives voice and/or data signals. Multiple application protocols (NFC, MiFare, etc.) can be supported. In one implementation, the smart chip 702 is programmable. Accordingly, different application (for payments, ticketing, identification, coupons, etc.) can be developed, downloaded to the smart chip, and commissioned. Thus in operation, in response to the secure element 130 being placed in close proximity with a suitable terminal, the terminal will trigger (via application protocol) an appropriate application stored in the smart chip, and the smart chip will respond appropriately with the terminal.

In one implementation, the smart chip uses a low-power RF transmitter/receiver to communicate with a terminal. The low-power output of the smart chip makes it susceptible to RF interference from neighboring devices. Specifically problematic are components associated with the mobile communication device, e.g., battery, antennae (internal or external), to which the secure element 130 is affixed. Thus, in one implementation, the secure element 130 includes an RF shield to insulate the smart chip from external interference. In one implementation, a lining of the secure element 130 is composed of an RF absorbent material/lining. In general, each phone has different levels of interference, and a material, size and thickness of the RF lining can determine an effectiveness of the RF shield. In one implementation, an RF shield can be placed between the secure element 130 and the mobile communication device 110.

Given the abuse a mobile communication device can take, components that are affixed externally to a mobile communication device need to be able to withstand some abuse. Thus, in one implementation, the secure element includes a ruggedized shell 704 that encases a smart chip (with antennae). In one implementation, the shell 704 is formed from a composite plastic or polymer. The shell 70 can be hard (and substantially inflexible) or be soft (and pliable). In one implementation, the shell 704 provides a protective membrane for the smart chip which prevents damage to internal circuitry, a surface to adhere to an RF lining and/or a mobile communication device with appropriate adhesive, and a surface to print branding and advertising. Types of adhesives that can be used to affix the secure element 130 to a mobile communication device include, for example, paper glue, super glue, polymers, and the like. In one implementation, the shell 704 has a maximum width (or diameter) of 25 mm, and has a maximum thickness (or depth) of 5 mm.

Figure 4C:
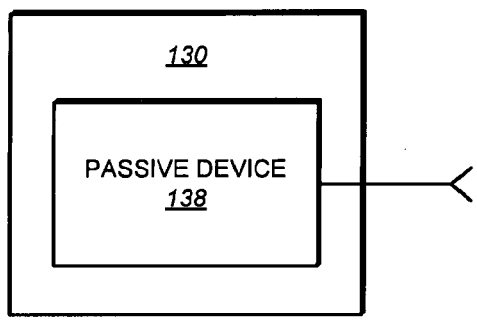

FIG. 4C shows another implementation of a secure element 130, in which the secure element 130 does not include a processor that is capable of bidirectional communications, but instead includes a passive device 138. The passive device 138 can be an RFID sticker or suitable tag that allows for uniquely identifying a user, such that a transaction that is initiated with the passive device 138 will cause the management server 180 to perform transaction details. In this implementation, the code received from the POS terminal 150 (or the POE terminal 190) is transmitted from the POS terminal 150 (or the POE terminal 190) to the management server 190, which then takes over the transaction. This passive device 138, with the identification code stored thereon, can thus be associated with a mobile communication device 110 not otherwise equipped for such communications, and the management server 190 can provide transactional information to the mobile communication device 110 using available channels on the mobile communication device (such as audio, SMS, or other known data transmission methods). While bidirectional communications do not occur with other devices, transactions are possible, because the management server 190 is involved.

SMS (Short Messaging Service) As A Data Transmission Method [0032] As discussed above SMS (Short Message Service) can be used as a data transmission method between the management server 190 and the mobile communication device 110. SMS is generally unstructured. Thus, when messages arrive in an inbox of a user inbox, the user cannot easily search, retrieve, or organize the messages. In addition, due to SMS's send-and-forget characteristics, it cannot be assumed that messages are received by the terminating point, or if received, received in a particular sequence. FIG. 8 illustrates a communication system 800 in accordance with one implementation. The communication system 800 includes a mobile communication device 802 that communicates with a remote server 804 (e.g., a transaction server) via SMS. The mobile communication device 802 includes a mobile application 806 that receives SMS messages from the remote server 804 and organizes the SMS messages (including linking corresponding messages into a pre-determined order) so that data can be stored and displayed to a user in an organized and easily retrievable fashion, unlike a conventional application that implements SMS as a data transmission method in which SMS messages remain in an unstructured format and are unlinked. Such an unstructured format does not allow the user to retrieve, organize, or manage the display of messages. The mobile application 806 can be, for example, a J2ME, BREW, Windows Mobile, or other type of application.

In one implementation, the mobile application 806 is a rich client application (also commonly referred to as a fat client application or thick client application). A rich client application is a client application that performs the bulk of any data processing operations itself, and does not necessarily rely on a server (e.g., remote server 804). The mobile application 806 can also be a thin client application or hybrid client application. In one implementation, the mobile application 806 is the Blaze Mobile Wallet Lite application available from Mobile Candy Dish Inc. or Berkeley, Calif. In one implementation, the mobile application 806 provides banking and money management transaction services, and transmits data from the wireless communication device 802 via SMS in accordance with a connectionless protocol.

FIG. 9 illustrates a communication system 900 in accordance with one implementation. The communication system 900 includes a mobile communication device 902, a management server 904, a user/profile database 906, and a money management database 908. In one implementation, the management server 904 is a Blaze server. In one implementation, the mobile communication device 902 stores a mobile application 910 that uses short message service (SMS) over a connectionless protocol to transmit data to the management server 904. SMS permits the mobile application 910 to send messages of a fixed size, for example, up to 160 characters, to and from the wireless mobile communication device 902. In one implementation, the management server 904 includes an SMS aggregator 912 to aggregate each message received from the wireless mobile communication device 902 and keep track of the ordering of each message, and (in one implementation) also groups each message into a corresponding group. In one implementation, the mobile application 910 also includes an SMS aggregator (not shown).

Thus, in one implementation, the mobile application 910 is not browser HTTP based, and delivers banking and money management services. The mobile application 910 also leverages a low-end communication infrastructure (also referred to herein as a "bearer service"). A bearer service that is universal on all mobile devices is the Short Message Service (SMS). SMS is a means of sending short messages to and from mobile phones to the Application Service Provider (ASP) Server "Server". It is inherently a connectionless communication protocol, i.e., send and forget. There is no acknowledgement to the Mobile Originating (MO) sender that the message sent was successfully received by the Mobile Terminating (MT) recipient. There is no concept of timeouts, message lost, message not received, etc. Leveraging SMS as a bearer service to support a 'rich' client application. The Client will listen to a specific incoming SMS port to be defined based on Network Operator/Carrier, Phone Vendor, etc.

In one implementation, the mobile application 910 provides banking and money management service, which includes (but is not limited to):

Registration: User creates new MW Lite account with PIN (PIN and user info can be stored in user/profile database 306) Security & Encryption: Sensitive information may optionally by encrypted using 3rdParty or native phone tools (Bouncy Castle, etc.). Encryption (Public/Private) keys may be managed or proxy'd by Server which may additionally be outsourced to 3rdparty Key Management vendor. Install & Configuration (I&C): Refers to setting up proxies to payment accounts (virtual, credit, debit & banking)

Payees (BillPay, Pay Anyone, etc.) and associated rules

Specify default payment account to debit fund transfers/unloading

Specify default payment account to credit fund transfers/loading

Activation of 3rdParty Services (Account Balance, Bill Pay, Fund Transfer, Funds Loading, Funds Unloading)

It is assumed Client application is pre-installed or downloaded to mobile device.

I&C to be performed via Kiosk, ATM, 3rdParty/Carrier Web Portal, MCD Web Portal, on mobile device, or other suitable device.

Loading Funds

Banking or financial data

Account balance

Transaction history

Bill Pay—Biller Direct

Fund Transfer—Intra Bank; Me-2-Me

Fund Transfer—Inter Bank; Me-2-Me

Fund Transfer—Inter Bank; Me-2-You (based on Bank Routing/Account#)

Fund Transfer—Inter Bank; Me-2-You (based on WalletID)

Fund Transfer—Inter Bank; Me-2-You (based on ACH Check). A.k.a. Bill Pay Anyone

Load Fund

Unload Funds (ATM Withdrawal, etc.)

Sync: Ensures server-side objects are downloaded to client and locally cached. This includes payment accounts, payees, payment rules, server-side cached account info (account balance, Last-N transaction history), etc.

This info will be cached on Client.

Users can create transaction either in ONLINE or OFFLINE (no network connectivity) mode Initiating/Triggering Banking Services:

Storage: Storage of Users MWLite info, User's payment account info (credentials, account balance, history, etc.); Banking Payment History (BillPay, Fund Transfer, Fund Loads, Fund Unloads, etc.)

Scenarios/Features

1. Overlaying connection protocol properties over SMS. This includes:

segmenting complex command and control (C&C) messages into 1 or more SMS messages, and re-constructing one or more SMS messages into complex C&C resultset messages. Re-constructing the one or more messages into complex C&C resultset messages can include one or more of the following providing acknowledgement, handling out-of-sequence incoming messages, handling unexpected messages or messages considered lost (due to timeout, etc.), Managing encryption as needed, and so on.

2. User uses the mobile application 910 to initiate/trigger appropriate banking service. For example, referring to FIG. 10A a user can initiate a bill paying service through which a payee (e.g., PG&E) can be paid. In one implementation, the display of the bill pay screen can include an advertisement as shown in FIG. 10A.

3. The mobile application 910 formulates appropriate banking services commands, for example:

```
"<command> <PaymentAccount> <Payee> <$amt> <tarnsferDate>
<PIN> <sequenceID> <message> <messages>"
``` billpay MCC-2345 PG&E 110.23 20070328 1234 36 1 1
transfer bofa-1007 jdoe 25.00 20070328 1234 36 1 1 Wwhere jdoe is a walletID
transfer bofa-1007 8005550001 25.00 20070328 1234 36 1 1 Wwhere 8005550001 is the phoneNumber of unloading station.
fundstransfer bofa-1007 gwbush 30.00 20070328 1234 36 1 1#gwbush is a payee

```
"<command> <PaymentAccount> <PIN> <sequenceID> <message>
<messages>"
```

Balance bofa-1007 1234 36 1 1

4. A Loading Station (Kiosk, etc.) can load funds by sending command to MCD's Loading Shortcode.

```
"<command> <PaymentAccount> <Payee> <$amt> <transferDate>
<PIN> <sequenceID> <message> <messages>"
``` load CorpBankPayrollAccount-2007 8005550001 4000.00 20070328 0987 43 1 1 (#Debit account CorpBankPayrollAccount-2007 by $4000 and credit account held by user with phone Number 8005550001)

5. Receive multiple (in/out sequence, missing, lost, etc.) messages to reconstruct a complex messages.
    <sequenceID>:<message>:<messages>; <body>
    "36:1:6; acct:Bofa-1007 bal:40123.32 date:20071009"
    "36:3:6; date:20071009 name:Merchant2 amt:123.81"
    "36:6:6; date:20071009 name:Merchant5 amt:423.81"
    "36:4:6; date:20071009 name:Merchant3 amt:223.81"
    "36:2:6; date:20071009 name:Merchant 1 amt:23.81"
    "36:5:6; date:20071009 name:Merchant4 amt:323.81"

In one implementation, post processing of these multiple messages results in the screen shown in FIG. 10B which displays the account balance and the last five transactions in a transaction history list. The list can be cached on the mobile communication device 902 for later use.

6. Cashed data is refreshed upon user request. This in turn invokes a command similar to the following:
    <command><account><PIN><sequenceID><message><messages>
    Balance Bofa-1007 1234 37 1 1 (# Where 37 is the next <sequenceID>)

Connection Protocol Properties

The above description introduced the concept on <sequenceID><message><messages>. The sequenceID is a rotating pool per Client, issued by the Client, used as a callback mechanism, i.e., match outgoing command messages and incoming resultset messages. Since resultsets can be long and complex, the resultset is broken into pages, where each page can fit with the allowed payload size of an SMS message. Hence, "<message><messages>" implies "Page 1 of 5". The Client (or mobile application) then has to wait for all <messages> to arrive before re-constructing the original resultset. Due to characteristics of SMS, the client has to handle scenarios when a message with an un-expected sequenceID arrives. In addition, if a missing page within the expected sequenceID fails to arrive within a specified time interval, the client needs to request retransmission, e.g., "retransmit 36:4:6 1234" which will instruct server to retransmit resultset 36, part 4 of 6.

The pool size (or range of valid sequenceID's) controls the asynchronous aspect of the application. The sequenceID is mapped to the command (at least until the sequenceID is re-used). Hence, the client will use the sequenceID to determine to command and associate the appropriate display style sheet to best display the resultset to the user. For example, if sequenceID=36 was issued by the command 'balance' which determines account balance, it makes sense to leverage the 'Account Balance & History' style sheet to present this information.

SMS messages to and from the mobile communication device has to be acknowledged. A simple protocol is necessary, for example, as follows:
1. # Mobile Originated (MO) command
    <command><body><sequenceID><message><messages>
    balance Bofa-1007 1234 37 1 1
2. # Server, a.k.a., Mobile Terminating (MT) receives and acknowledges receipt of message '37 part 1 of 1."
    ack 37 1 1
3. # MT responds with resultset
    36:1:2; acct:Bofa-1007 bal:40123.32 date:20071009
4. # MO receives and acknowledges receipt of message '36 part 1 of 2." ack 37 12
5. # MT responds with resultset (part 2 of 2) "36:2:2; date:20071009 name:Merchant 1 amt:23.81"
6. # MO receives and acknowledges receipt of message '36 part 2 of 2." ack 37 22
7. # MO has received all messages. Reconstruct & store message
8. # Next time user view account balance, display cached (local store) information:
    Bank Account: Bofa-1007 Balance:
    $40,123.32 as of Oct. 9, 2007
    Oct. 9, 2007 Merchant 1 $23.81

Online/Offline Access

In one implementation, a mobile communication device creates task/objects either while connected with a Server (online-mode) or when no connection is available (offline-mode). Tasks/objects are specific to mobile banking service and include for example: schedule (or cancel) a fund transfer transaction, schedule (or cancel) a bill pay transaction, and manage other banking transactions. In addition, digital artifacts (coupons, tickets, etc.) that possess a state (or status) (e.g., Assigned, Saves, Redeemed, Deleted, etc.) can undergo changes on the mobile communication device. Given these tasks/objects associated to Banking Services and Digital Artifacts has 'states' that can be changed in either an online-mode or offline-mode, the Server has to be refreshed/updated either in real-time (online-mode) or in batch (offline-mode).

For example, given a situation in which a user is travelling in a region in which the user's mobile communication device does not have network access and the user needs to transfer funds into a checking account, the user can use the mobile communication device (with the Mobile Wallet Client application) to schedules a fund transfer in offline mode. Since the mobile communication device has no network connectivity, the Client (in OFFLINE mode) creates a 'task' to represent the fund transfer (or any other banking service) using banking information (Banks accounts, etc.) previously cached on mobile device. The task can have an initial state (e.g., "pending"). While the Client is enabled the Client will actively monitor network access. When the user travels into a region where network access is available, the client will identify the network and automatically re-connect to the network. The client will then negotiate with a server and any tasks having a "pending" state on the client are then uploaded to server (either in batch mode or one task at a time). The client (in ONLINE mode) will refresh states of all task from the server (including the recently added tasks) to present to the user the updated status of all tasks managed by the server. Other services possible include, for example: request schedule (or cancellation) of Bill Pay transaction, request schedule (or cancellation) of Fund Transfer transaction, request schedule (or cancellation) of Pay Anyone transaction, any other state-based banking transaction service.

Using the client (or mobile application), a user can store digital artifacts (e.g., coupons, tickets, etc.) on a mobile communication device. These digital artifacts are objects that are consumed by a 3rdParty, e.g., a ticket can be redeemed at a theater, and a coupon can be redeemed at the Point-Of-Sale of a retail merchant. Hence, this is a 3-way sync: 1) mobile communication device with server, 2. mobile communication device with 3rdParty Merchant, and 3) server with 3rdParty Merchant. For user's convenience, redemption of digital artifacts by a 3rdParty must be enabled in an environment with or without network access. For example, a user with an electronic ticket on a mobile communication device may wish to redeem an eTicket at a theater. However, if there is no network access inside the theater, the user will still need access the eTicket on the client. In ONLINE mode, the client will cache (local store) the eTicket (and any other digital artifact.) In the theater, the client (in OFFLINE mode) will be able to redeem the eTicket and update the state of the eTicket on the mobile communication device (e.g., change state from 'valid' to 'redeemed'). This prevents the user from re-using the eTicket. At some point when the mobile communication device re-acquires network connectivity, the client will then negotiate with the server and any artifacts with a state change (e.g., 'valid' to 'redeemed', etc.) on the client are then uploaded to the server (e.g., either in batch mode or one task at a time).

The client (in ONLINE mode) will manage and refresh states of all artifacts from the server (including the recently added tasks) to present to the user. In one implementation, the server is the master repository. In the process of redeeming the eTicket, the eTicket is uploaded to the merchant (via secondary out-of-band communication link, e.g., RFID/NFC, Bluetooth, etc.). This is necessary for theater to update their inventory systems. The 3rdParty may liaise (via an internet connection) with the server to validate eTicket and authenticate the user.

POS (Point of Sale) Terminal

Figure 5:
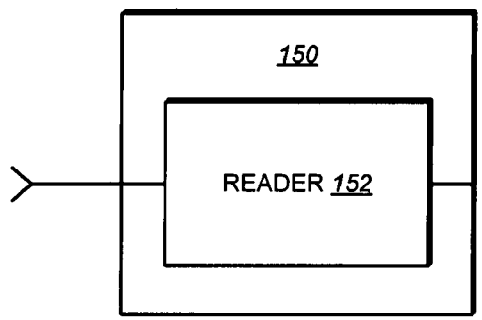
FIG. 5 illustrates one implementation of a point of sale terminal.

The point of sale terminal 150 illustrated in FIG. 5 is conventional, in that it has the capability of electronically reading information from a device equipped to transmit information in a format that it reads. Thus, the reader 152 within the point of sale terminal 150 can be of one or many types. If the point of sale terminal reader 152 includes the provision for NFC communications, then simply bringing the secure element 130 with the NFC transceiver will cause initiation of a transaction and the transmission of the identification code associated with the secure element 130 and thus the user.

In one implementation, various software that is downloaded into the memory 126 of the radio element 120 and the secure memory 132 of the secure element 130, along with software resident on the management server 180, cooperate at a layer that is above the physical layer of the communications, in order for the desired transaction to occur. This software is implemented using based upon known knowledge of mobile communication device 110 internals and application platforms, NFC, smartcard internals and application platforms, payment protocols (e.g. PayPass), and the working/workflow associated with POS and POE terminals, and the transaction and management servers. In addition, the present invention provides for piggybacking a tunneling protocol on top of the payment protocol, so that the secure elements 130 can communicate with the transaction server 170 and/or the management server 180, without modification to the POS terminal 150 or the POE terminal 190. As such, this includes software within the secure element 130 that embeds the required information in fields which will not adversely affect the performance of the POS terminal 150 and/or the POE terminal 190, and also software in transaction server 170 that will extract the piggybacked payload, associate the payload with the management server 180 if needed, and then authenticate, authorize, and execute transfers of transaction information to the management server 180. In one implementation, the piggybacked payload is sent, instead of to the transaction server 170, to the management server 180, which can then associate the transaction and notify the transaction server 170, the POS terminal 150 and/or the POE terminal as needed.

In one implementation, the management server 180 has the capability of storing codes that are from a variety of different mobile communication devices. Thus, codes that are associated with a smart card having an RFID can be stored, as can be codes stored from an RFID sticker, as well as codes that are associated with a smart card that communicates using a slide reader, Bluetooth, or an NFC channel, for example. As such, the management server 180 can store user personal and credit and transactional information and history, including a code associated with the user, for a variety of different mobile communication devices, thereby allowing a system which can scale.

Figure 6A:
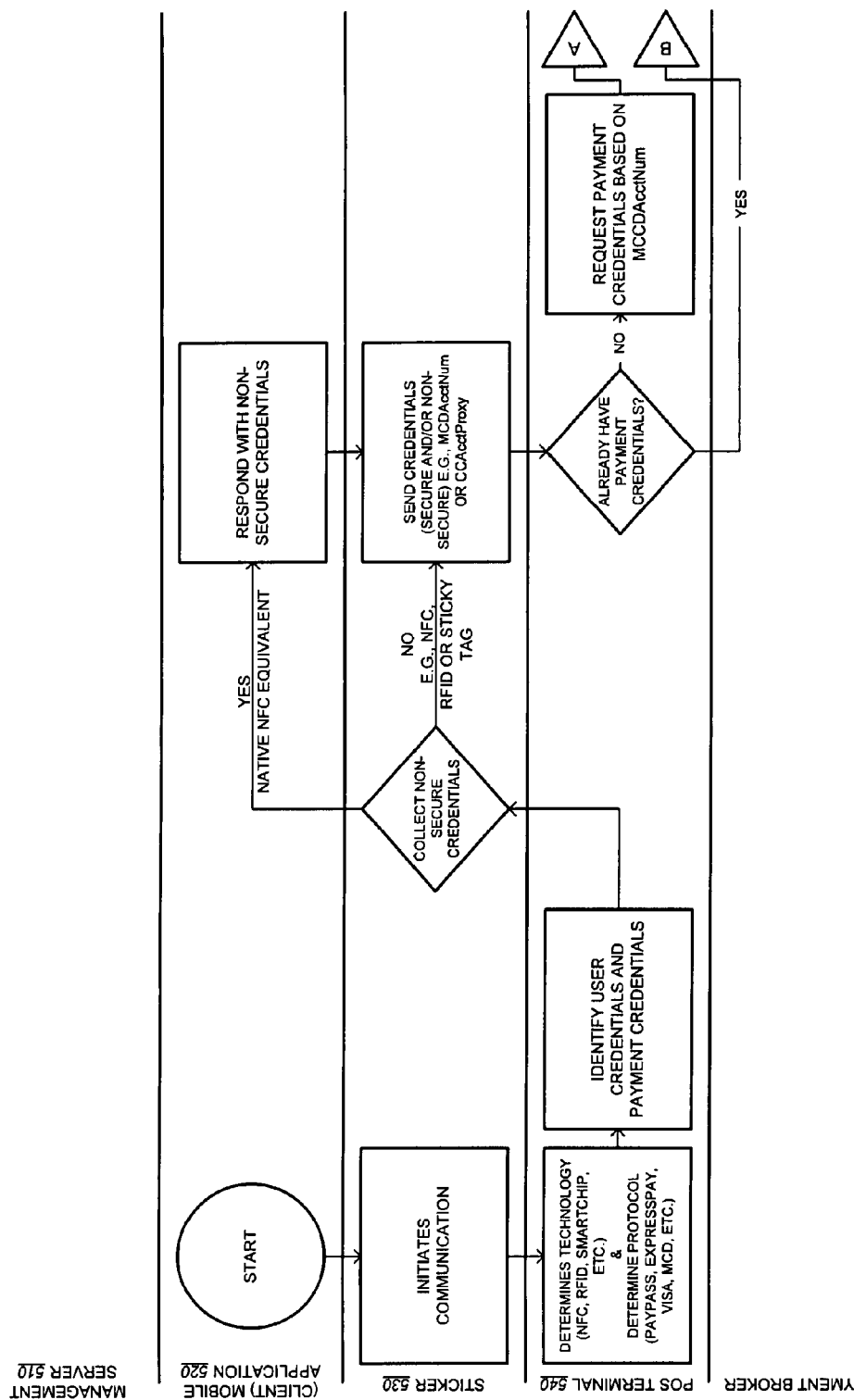
FIGS. 6A-6D illustrate a flowchart for conducting a transaction according to one implementation.
Figure 6B:
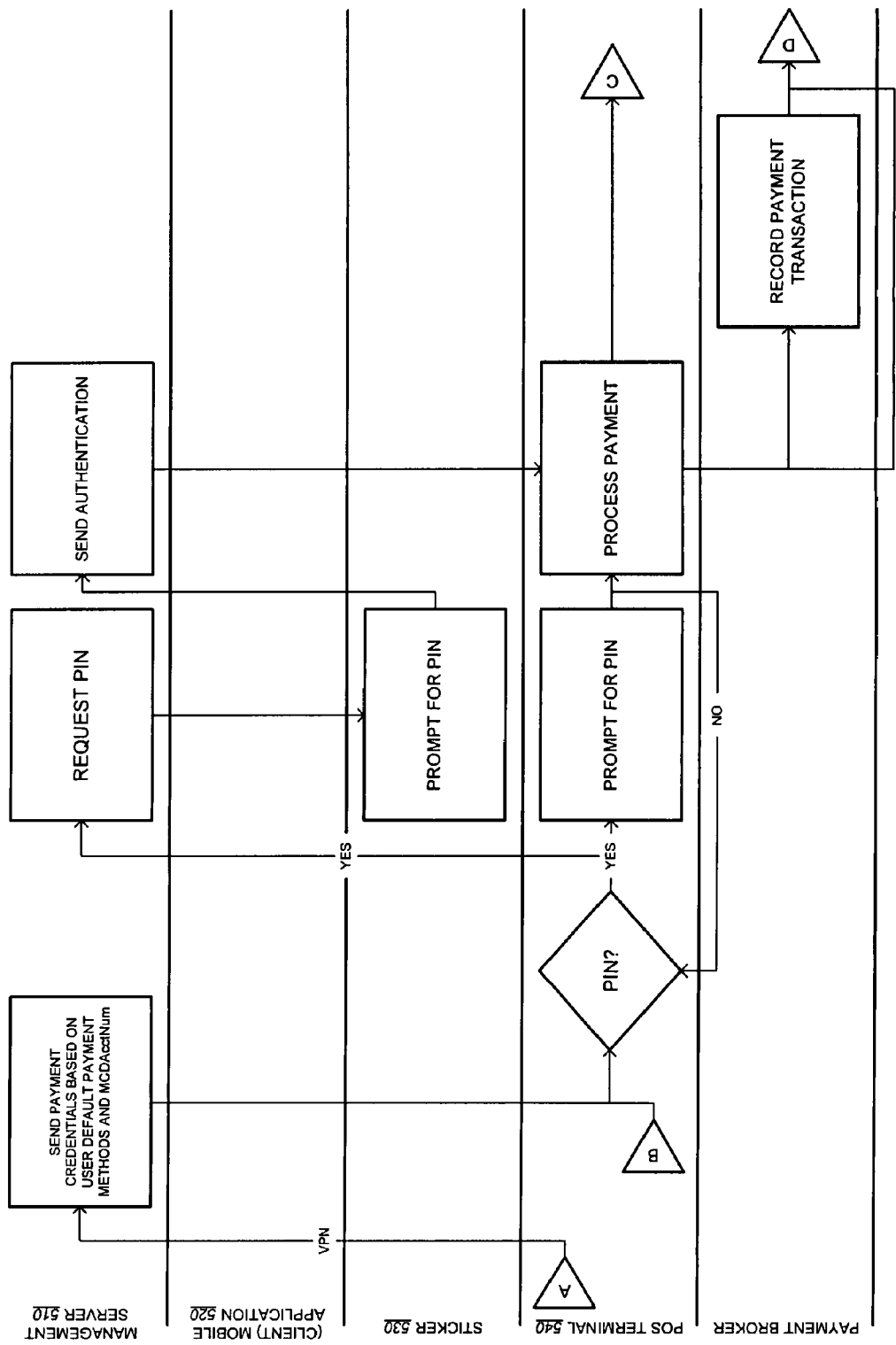

FIGS. 6A-6D illustrate a flowchart of a transaction in accordance with one implementation, and the various steps that are included in the transaction, with reference to which of the various devices are implementing this step. Referring to FIG. 6A, a user first waves a mobile communication device 530 (e.g., a NFC device or device having an attached sticker) across (or near) a POS terminal 540. The POS terminal 540 identifies the technology associated with the mobile communication device, a payment method, user credentials, and payment credentials. Irrespective if t mobile communication device is a NFC-Phone or includes an attached sticker, the mobile communication device sends to the POS Terminal 540 payment credentials including optional credentials (e.g., WalletID). As shown in FIG. 6B, using optional credentials (e.g., WalletID), contact is made with a transaction server 510 to request payment credentials. The POS terminal 540 determines if a security code prompt (e.g., a PIN) is needed? If yes, a prompt is made for the security code (PIN) on the POS terminal 540 and the process continues with processing of the payment. Otherwise, the POS terminal 540 simply proceeds with processing of the payment. As an alternative, the POS terminal 540 can integrate via the back office to a management server 510 and trigger a PIN prompt on the mobile communication device. In such a case, the user can enter the PIN on the mobile communication device (instead of through the POS terminal 540). The POS terminal 540 hands processing to a payment broker.

Figure 6C:
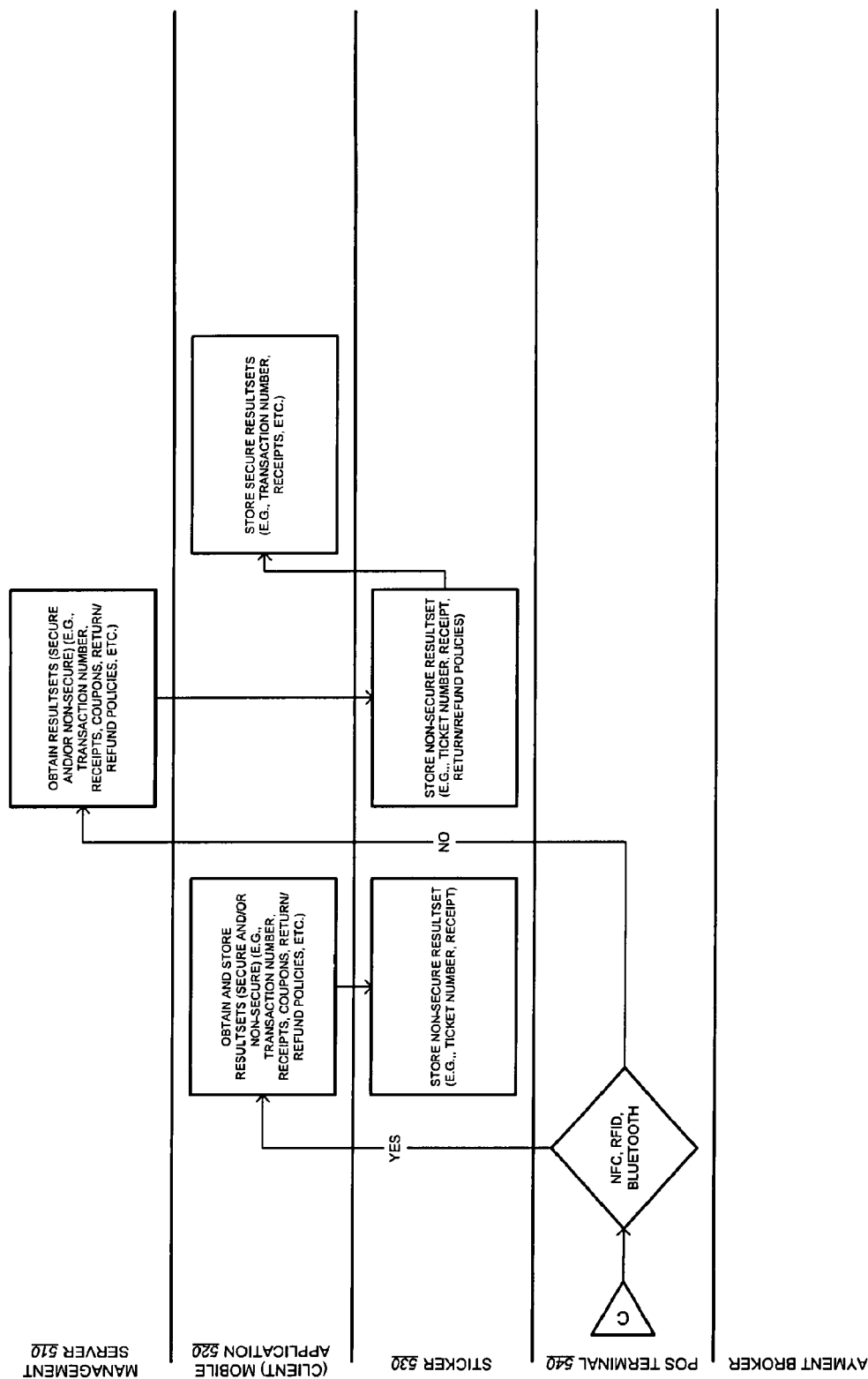

Referring to FIG. 6C, assuming the POS terminal 540 was capable of 2-way communication, if the POS terminal 540 determines that the mobile communication device is a NFC Phone, the POS terminal 540 can write digital artifacts (e.g, eReceipts, eTickets, eCoupons, etc.) to the mobile communication device. Non-secure data is stored in the mobile communication device. Otherwise, the POS terminal 540 sends optional digital artifacts to the management server 510. As part of an out-of-band sync between the management server 510 and the mobile communication device, the non-secure digital artifacts are downloaded and stored in the mobile communication device. Secure digital artifacts are downloaded to the mobile communication device and stored on a secure element of the mobile communication device (if possible).

Figure 6D:
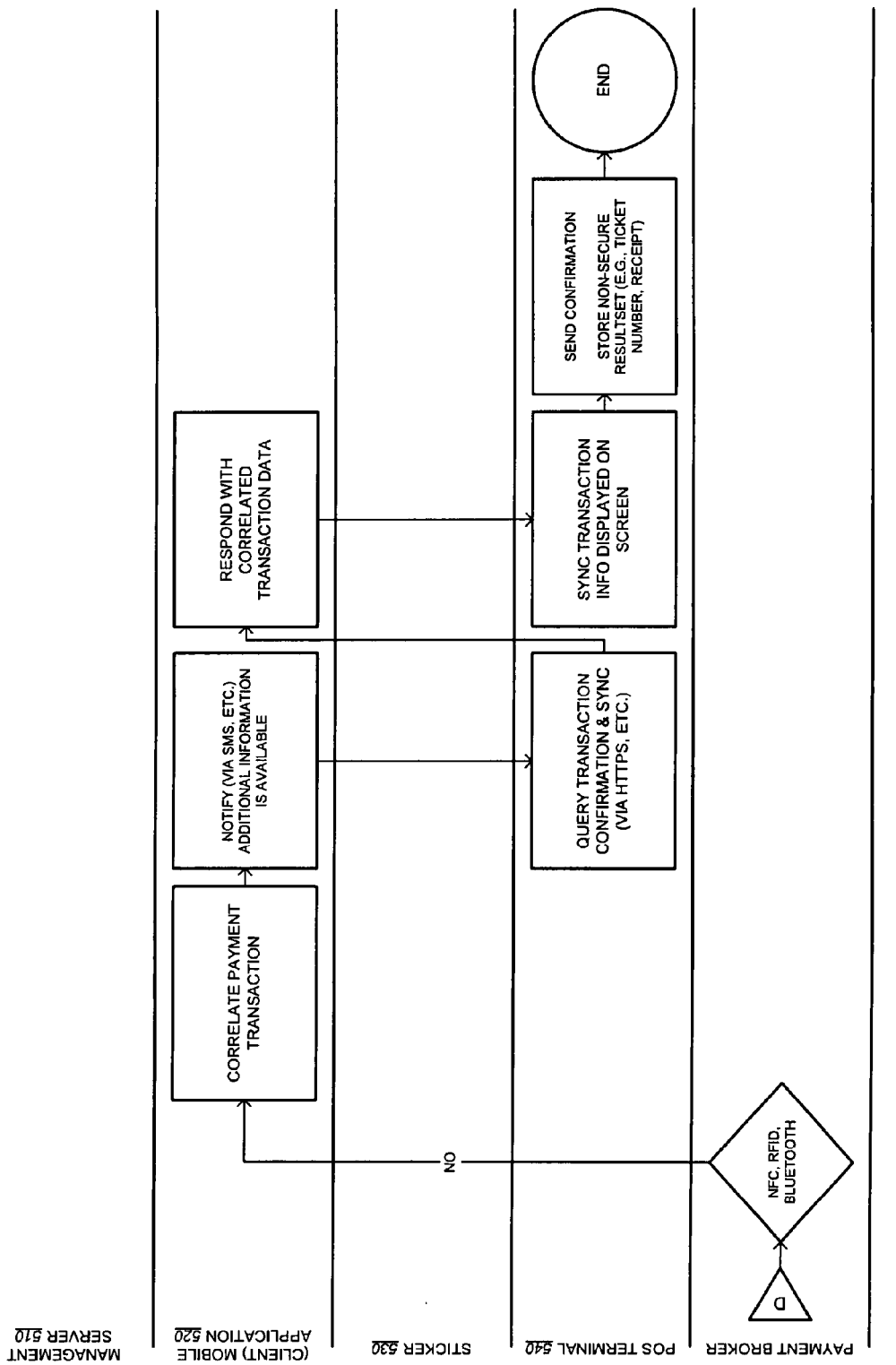

In FIG. 6D, upon successful payment processing and assuming the POS terminal 540 was capable of 2-way communication, if the POS terminal 540 determines that the mobile communication device is not an NFC Phone, the POS terminal 540 triggers the management server 510 of payment processing completion. Note, this can be time delayed due to a difference when a payment is posted and cleared. The management server 510 can send a notification to the mobile communication device (via SMS, etc.). Since the mobile communication device could be shutdown, the notification will wake-up the mobile application running on the mobile communication device, and initiate SYNC operations between the management server 510 and the mobile application (or client). Any pending digital artifacts (including notifications, etc.) are displayed on the mobile communication device.

The present invention, as described previously, allows for various different programs to exist within the memory 126 of the radio element 120, as well as in the secure memory 132 of the secure element 130.

Mobile Tickets (eTickets)

In one implementation, a mobile ticket (also referred to herein as "electronic ticket" or "eTicket") includes both a unique code that is sent to the consumer's cell phone and a database that allows for the validation of the consumer using their cell phone number and the unique code. The mobile ticket can be used at kiosks in addition to interfacing with a ticket agent. The mobile ticket may be used with or without cell phones equipped with radio technology (i.e., RFID or NFC). In operation, a mobile ticket works when the user is sent a unique code (alpha-numeric, numeric, etc.) to their cell phone. The user is validated as a customer by their cell phone number and their code. If these match the information stored in a central database, the user is allowed admission into a venue by either manual validation by a ticket agent or automatically using RFID or NFC technology.

In general, an electronic ticket can be delivered to a mobile device and allow a consumer admission into a sports venue, entertainment venue (e.g. concert or movies), or other point of sale location either manually if the consumer displays the electronic ticket to an agent who may issue a paper ticket to the consumer or automatically if the consumer waves their cell phone (if equipped with a radio transmitter) over a POS device which contains a radio receiver. In one implementation, an electronic ticket (or tickets) is selected by viewing an image of the venue seating map. The seating map can be rendered on the mobile device. Users can zoom in/out of the seating map. As User zooms in, additional layers (details, info, etc.) is presented. For example, a user can view Venue->Quadrant->Level->Section->Row. The ability to zoom in/out and present additional levels of details can be processed either on the mobile device (Client) or on the Content Server, the end result is an updated image rendered on the mobile device. In one implementation, seats are color coded to represent availability and price. In this manner, seat inventory (what's available and at what price) can be illustrated graphically. Once user has navigated to lowest level, the image is granular enough to select individual seats. In one implementation, a seat selection will automatically cause a price to be calculated. Any service fee can be included in the ticket price. Once user confirms purchase, reservation request is sent to ticket inventory system. If reservation is successful, a valid electronic ticket is returned to the mobile device.

The present invention can also be interfaced with certain known and implanted payment protocols, such as Paypass. For implementing these additional payment protocols, implementation of streaming communication protocols (in the full NFC case), protocols for session setup, and configuration of communications modules and secure data areas as needed is necessary, taking into account the communication protocol used (e.g. NFC, Bluetooth, WIFI, CDMA, 3.sup.rd Generation CDMA for example) as well as file transfer protocols and facilities access protocols. In particular, in implementing such protocols, the ability to extract transaction information from the POS terminal 150 to the secure element 130 can be provided during the course of the local interaction between the POS terminal 150 and the secure element 130. For instance, the implementation of PayPass within the invention will take note, and alert the application running on the radio processor 123 that a purchase or purchase attempt has occurred, as noted above in the context of the alert discussion. In one implementation, a feature is provided that permits information passed via the PayPass protocol to the POS terminal 150 (and thence to the transaction server 170) to be augmented with additional fields containing the elements of the tunneling protocol, for subsequent processing by the transaction server 170, either directly, or through the management server 180.

The two transaction workflows that have been specifically discussed above are the credit card and ticketing workflows. Other transaction flows can also be implemented. Debit card and cash card transactions are similar to credit card transactions, with variations being implemented to account for the differences that exist in those types of transactions, which types of transactions are well understood. Coupons can be implemented with the invention, in much the same manner as tickets, though coupons can be transmitted without there being payment. Many of the transaction types noted herein will, as is apparent, require communication between the secure element 130 and the radio element 120. As such, due to that requirement, a significant part of the preceding discussion has been directed to how to implement that communication, particularly for mobile communication devices 110 that are not manufactured to allow for such communications.

An example of a typical transaction requiring such communication between the secure element 130 and the radio element 120 is one in which the POS terminal 150 allows for the transfer of detailed purchase information from the POS terminal 150 to the secure element 130, as well as transactional information from the POS terminal 150 and/or the transaction server 170 to the management server 180. The management server 180 can then also communicate with the radio element 120 via the radio channel. This allows for the matching and reconciliation of detailed purchase information and, if the transaction fails, failure details can be matched to the purchase information, and forwarded in real-time to the user via the radio element 120. In one implementation, there is included the provision for different phones to communicate the results of a transaction, particularly using the POS transceiver or one of the Bluetooth/Wifi transceivers. In this implementation, after a transaction has been completed with one of the mobile communication devices 110a, another mobile communication device 110b can receive information regarding the transaction completed. Thus, for instance, if mobile communication device 110a purchases two tickets, one of the tickets can be transmitted to the mobile communication device 110b by each using a POS transceiver or one of the Bluetooth/Wifi transceivers.

Although the present invention has been particularly described with reference to implementations discussed above, various changes, modifications and substitutes are can be made. Accordingly, it will be appreciated that in numerous instances some features of the invention can be employed without a corresponding use of other features. Further, variations can be made in the number and arrangement of components illustrated in the figures discussed above.

The invention claimed is:

1. A method for purchasing a ticket on a mobile communication device, the method comprising:
provding a mobile communication device with a visual display, a first processor, a first communication channel which supports voice and data interactions at a first radio transceiver at the mobile communication device using at least one of GSM and CDMA, and a secure element coupled to the mobile communication device having a memory, a processor configured for near field communications and a plurality of communication transceivers each of which supports a different respective communication protocol including at least near field communications;
executing an application on a processor of the mobile communication device to display information corresponding a ticket to be purchased, the information displayed on the display of the mobile communication device;
receiving user input corresponding to a ticket purchase;
sending via the first transceiver, a reservation request for the ticket purchase data to an external system ;
initiating execution of a payment application operating at an application layer above the physical communication layer on a processor of a secure element in response to a near field communication4 interaction with a remote point-of-sale terminal for the ticket purchase transaction wherein the point of sale terminal is physically distinct from the mobile communication device
storing, in a memory of the secure element, the payment application and payment credentials, the execution of the payment application facilitating the transfer of the payment credentials to a remote Point of Sale terminal in response to a near field communication trigger between the secure element and the remote point-of-sale terminal without prior authentication;
the processor of the secure element, wherein the processor is configured for near field communication, and further wherein the processor executes the payment application stored in the memory,
sending, using the wireless transceiver of the secure element, transaction data including the payment credentials associated with the executed payment application in response to a near field communication trigger by the Point-Of-Sale device through a second communication channel to the remote Point-Of- Sale terminal, wherein the transaction data including the payment credentials are transferred to the Point-Of-Sale terminal without prior authentication, the second communication channel being different from the first communication channel through which the mobile communication device communicates voice and data;
wirelessly transmitting the payment credentials to the point-of-sale terminal over the second communication channel, wherein the transaction data including the payment credentials are transferred to the Point-Of-Sale terminal without prior authentication; and
receiving at the secure element an electronic ticket corresponding to the ticket purchased.

2. The method of claim 1, wherein execution of the application displays a seat map with color coding to represent availability and pricing of seats at a venue for the ticket to be purchased.

3. The method of claim 1, where the secure element is attached externally to the mobile communication device , but is not electrically connected to the interior components of the mobile communication device.

4. The method of claim 1, wherein the secure element is internal and removably integrated into a slot with the mobile communication device.

5. The method of claim 1,wherein the secure element is -internal and permanently integrated with the mobile communication device, and the secure element utilizes the RFID channel for communication.

6. The method of claim 1, wherein the electronic ticket is received at a transceiver associated with the mobile communication device and stored in the memory of the mobile communication device.

7. The method of claim 1, wherein the electronic ticket is received at the transceiver associated with the secure element and stored in the memory of the secure element.

8. The method of claim 7, wherein the electronic ticket is redeemed using near field communication (NFC) transmission between the transceiver of the secure element and a near field communication (NFC) terminal.

9. The method of claim 1, further comprising receiving a digital artifact corresponding to the purchase of the electronic ticket.

10. The method of claim 9, wherein the digital artifact is a receipt or a coupon.

11. The method of claim 1, further comprising transmitting the ticket from the first mobile device to a second mobile communications device using the devices' POS transceivers, Bluetooth, or WIFI.

12. The method of claim 6 wherein the ticket is received at the memory of the mobile communication device from the remote server, whereby the remote server receives notification of the ticket purchase from the POS terminal.

13. The method of claim 6 wherein the ticket is received at the memory of the mobile communication device from the secure element.

14. The method of claim 6 where the ticket is redeemed from the memory of the mobile communication device automatically by a point-of-entry device.

15. The method of claim 6 wherein the mobile application software residing on the mobile devices caches the ticket so that the ticket can be redeemed even when the mobile communication device lacks connectivity over the first communication channel to the remote server.

16. The method of claim 14 where the ticket status on the mobile communication device is changed to redeemed so that the electronic ticket will not be processed in subsequent attempts at redemption.

17. The method of claim 16 further comprising connecting the mobile communication device to an external server when network connectivity exists over the first channel to synchronize the status of the stored electronic ticket stored on the mobile communication device with a status of the electronic ticket as maintained on an external server maintaining ticket status.

18. The method of claim 17, wherein synchronizing includes-receiving a change in status of the electronic ticket following a determination that an electronic ticket has been redeemed, whereby the electronic ticket will not be processed in subsequent attempts at redemption.

19. The method of claim 7 where the ticket is received at the secure element memory from the POS terminal.

20. The method of claim 7 where the ticket is received at the secure element memory from the mobile communication device.

21. The method of claim 8 where the ticket status on the mobile communication device is changed to redeemed so that the electronic ticket will not be processed in subsequent attempts at redemption.

22. The method of claim 21 further comprising connecting the mobile communication device to an external server when network connectivity exists over the first channel to synchronize the status of the stored electronic ticket stored on the mobile communication device with a status of the electronic ticket as maintained on an external server maintaining ticket status.

23. The method of claim 22, wherein synchronizing includes-receiving a change in status of the electronic ticket following a determination that an electronic ticket has been redeemed, whereby the electronic ticket will not be processed in subsequent attempts at redemption.

24. A system for purchasing a ticket on a mobile communication device, the system comprising:
a mobile communication device with a visual display, a first processor, a first communication channel which supports voice and data interactions at a first radio transceiver at the mobile communication device using at least one of GSM and CDMA, a secure element coupled to the mobile communication device, and an application running on a processor of the mobile communication device which displays information corresponding a ticket to be purchased, receiving user input corresponding to a ticket purchase, sending via the first transceiver, a reservation request for the ticket purchase data to an external system;
a processor of the secure element that is configured for near field communications and executes a payment application in response to a near field communication interaction between the mobile communication device and a remote point-of-sale terminal for the ticket purchase wherein the point of sale terminal is physically distinct from the mobile communication device;
a memory of the secure element stores the payment application and payment credentials, the initiation of the execution of the payment application operating at an application layer above a physical communication layer facilitating the transfer of the payment credentials to the Point of Sale Terminal;
a wireless transceiver of the secure element that sends transaction data including the payment credentials associated with the executed payment application through a second communication channel to the Point-Of- Sale terminal without prior authentication, the second communication channel being different from the first communication channel through which the mobile communication device communicates voice and data, and
the mobile communication device receives a digital artifact corresponding to the ticket purchased.

25. A method for purchasing a ticket using near field communication between a secure element coupled to a mobile communication device and a Point-of-Sale terminal, the method comprising:
providing a mobile communication device having a visual display, a first processor that executes a mobile application, and a first radio transceiver which supports voice and data interactions over a first communication channel using at least one of GSM and CDMA;
utilizing the secure element coupled to the mobile communication device,
the secure element including:
a memory storing a ticket application and payment credentials,
a second processor that executes a ticket application stored on the memory in response to a near field communication interaction between the secure element and a remote Point-of-Sale terminal,
a near field communication transceiver that sends transaction data including ticket associated with the executed ticket application through a second communication channel, the second communication channel different from the first communication channel;
executing, by the second processor of the secure element that is activated by a near field communication interaction between the secure element and a Point-Of-Sale terminal, the initiation of the ticket application operating at an application layer above the physical communication layer executed in response to a near field communication interaction between the secure element and a Point-Of-Sale terminal using the near field communication transceiver of the secure element;
wirelessly transmitting the transaction data which includes payment credentials corresponding associated with the executed ticket application from the secure element to the remote Point-Of-Sale terminal over the second communication channel without prior authentication, wherein transmission of the transaction data results from executing the ticket application on the processor of the secure element is in response to a near field communication interaction between the secure element and the Point-Of-Sale terminal.

26. A mobile communication device for purchasing a ticket using near field communication transaction with a point-of-sale terminal physically distinct from the mobile communication device, the mobile communication device comprising:
a first processor that executes a mobile application;
a secure element coupled to the mobile communication device, the secure element comprising:
a memory storing a ticket application and a ticket, the execution of the ticket application operating at an application layer above a physical communication layer facilitating the transfer of the transaction data including payment credentials from the secure element to the Point-Of- Sale terminal;
a second processor, activated by a near field communication interaction between the secure element and a Point-Of-Sale terminal, that initiates the execution of the ticket application in response to a near field communication interaction between the secure element and a Point-Of-Sale terminal; and
a near field communication transceiver that sends transaction data including the payment credentials associated with the executed ticket application through a second communication channel from the secure element to the Point-Of-Sale terminal without prior authentication.

* * * * *